E. V. ANDERSON.
FLUID CONTROLLED ELECTRIC REGULATOR.
APPLICATION FILED NOV. 25, 1912.
1,164,159.
Patented Dec. 14, 1915.
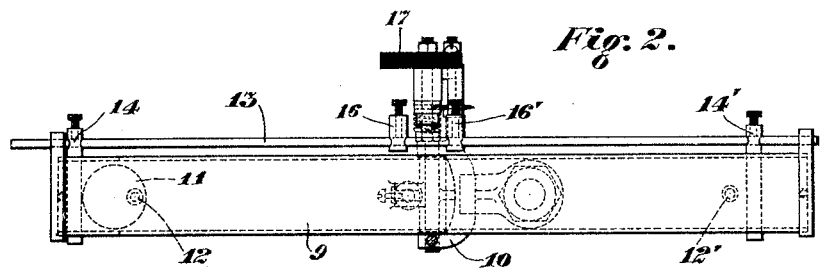
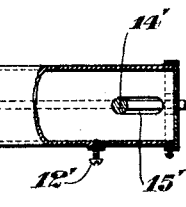
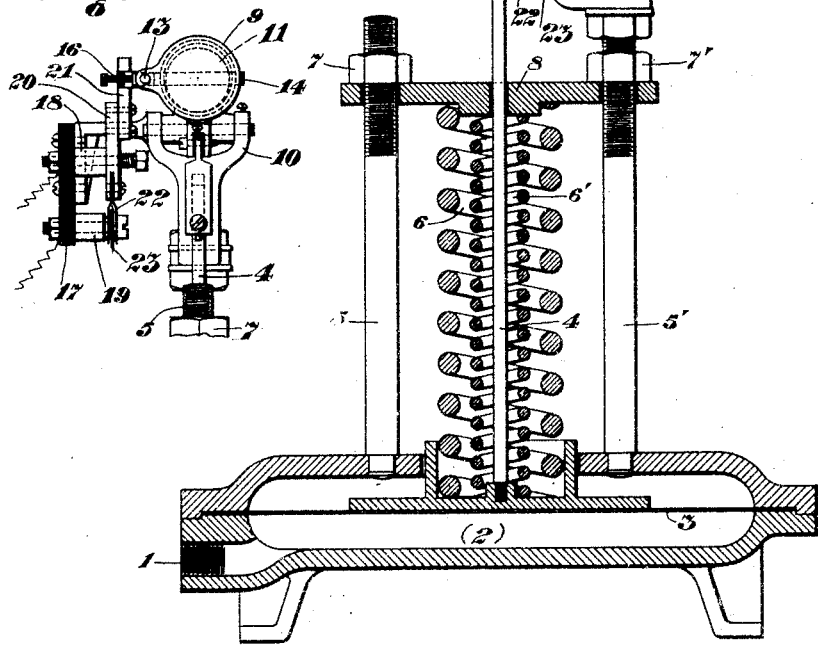
Witnesses:
Jo. Baily Brown
Wal Heckman
Inventor:
Edward V. Anderson
By F. W. H. Clay
His atty.

UNITED STATES PATENT OFFICE.

EDWARD V. ANDERSON, OF MONESSEN, PENNSYLVANIA, ASSIGNOR OF ONE-HALF TO CHARLES E. GOLDEN, OF CRAFTON, PENNSYLVANIA.

FLUID-CONTROLLED ELECTRIC REGULATOR.

1,164,159.  Specification of Letters Patent.  Patented Dec. 14, 1915.

Application filed November 25, 1912. Serial No. 733,301.

*To all whom it may concern:*

Be it known that I, EDWARD V. ANDERSON, a citizen of the United States, residing at Monessen, in the State of Pennsylvania, have invented certain new and useful Improvements in Fluid-Controlled Electric Regulators, of which the following is a specification.

My invention relates generally to attachments for stopping and starting an electric motor, or otherwise controlling a circuit by change of pressure in a fluid container. Its primary object is to provide certain and simple means to open and close an electric circuit whereby to maintain the level of liquid or the pressure of fluid in a tank between fixed maximum and minimum limits, and to make the action of such attachments adjustable and more sensitive as well as more positive. This and other objects are attained by means of apparatus of which I show an example in the drawings, wherein—

Figure 1 is a rear elevation and partial vertical section of the apparatus showing the operating parts inside; Fig. 2 is a plan of the operating means for throwing the electric switch; and Fig. 3 is an end view of the upper part of the mechanism, from the left in Fig. 1.

In my apparatus, the casing forming a pressure chamber (2) has a connection 1 to any tank in which fluid level or pressure is to be controlled. The chamber (2) is beneath a closed diaphragm 3, which divides the casing transversely. To the upper side of this diaphragm is attached a stem 4; bolts 5, 5', fastened to the casing and threaded at the other end, carry a guiding plate 8 confining coil springs 6, 6', which are placed around the stem 4 with their lower ends bearing against the diaphragm 3. It may be adjusted in position by nuts 7, 7', to regulate the pressure necessary to operate the rockable cylinder. The upward pressure of the fluid in the chamber (2) and the downward pressure of the springs 6, 6', are normally neutralized. The upper end of the stem 4 is adjustably carried in a sleeve 4ª pivoted by pin *a* to a fixed lug *b* on the cylinder 9, which in turn is pivoted near its middle point on a fixed forked arm 10, rigidly attached to one of the bolts 5, 5'. Inside the cylinder is a ball 11 of slightly less diameter than the hollow of the cylinder so that it is free to roll from end to end therein except as it is retarded at either end by the set-screws 12, 12', inserted in the bottom of the cylinder to normally retain the ball until the desired slant of the cylinder is attained, so that the ball once started rolls rapidly. Slidably mounted on the cylinder and running the full length thereof is a rod 13, which bears, adjustably mounted near its ends, rigid studs 14, 14', which extend through slots 15, 15', through the cylinder. Near the middle of this bar 13, and adjustably mounted thereon, are two rigid studs 16, 16'. On one fork of the supporting arm 10 is mounted a non-conducting plate 17, to which are fixed posts 18 and 19 connected to the termini of an electric circuit through the motor or other apparatus to be started and stopped. Pivotally mounted on the post 18 and in good electrical contact with it is a switch-lever 20 which carries a non-conducting arm 21 extending upward between studs 16 and 16' of the bar 13. The switch lever 20 has a copper spring 22 to slip over the contact washer 23 on the post 19, as is usual in switches.

A pipe running from a storage tank into my apparatus at inlet 1, the operation is as follows: fluid enters the chamber (2) and its pressure is exerted upward on the diaphragm 3. The pressure of springs 6, 6' opposed to the fluid pressure on the diaphragm determines the condition in the tank, as by adjusting their compression by means of nuts 7, 7', on bolts 5, 5', any desired pressure of fluid in the tank is fixed as the point which equalizes the pressure on the two sides of the diaphragm. When more fluid pressure overcomes the springs, the stem 4 is pushed upward. This raises the left end of the cylinder 9, the ball 11 by force of gravity rolls over the set screw 12 and toward the other end and strikes the stud 14', extending across its path, and thus slides the bar 13 in its loose mountings. The stud 16 acting on lever 21 throws switch 22 out of engagement with contact 23, thereby breaking the circuit and shutting off the motor pump, or ringing a bell, etc. As soon as fluid is drawn from the tank so that the pressure of the springs exceeds that of the fluid in the chamber (2) the stem is pushed down, the cylinder is tilted in the opposite direction and as it passes the horizontal position the ball rolls to the other end, strikes stud 14, slides the bar to the right, and makes the circuit.

It will be understood that since my device operates through the making and breaking of an electric circuit, it may be used for any sort of control operated by electricity, such as the ringing of signal bells, operating a signal dial, etc., so long as such operations are to depend on the change of pressure of a fluid.

Other uses, advantages, and conveniences of the device will be apparent to those familiar with the art.

Having thus described my invention and illustrated its use, I claim:

1. An electric regulator switch comprising a motor element, a fixed electrode, a movable electrode, a slotted rocking cylinder containing a rolling ball and attached to be tilted by said motor element, and connections to the moving electrode including a rod and a finger projecting through the slots of the cylinder into the path of the rolling ball whereby the switch is closed by the impact of the rolling ball when the cylinder is tilted.

2. In an electric regulator, the combination with a motor element, of a pivotally mounted slotted cylinder, an eccentrically pivoted connection of said motor element to the cylinder, a ball in the cylinder, a sliding rod mounted on the cylinder and having rigid studs projecting through the slots into the path of the ball in the cylinder, and an electric switch operated by the reciprocation of said rod whereby the switch is closed suddenly by impact of the ball on one of the studs after the ball has traversed the length of the cylinder.

3. In an electric regulator, in combination with a reciprocating motor element, an electric switch operating device comprising a rocking slotted cylinder moved by reciprocation of said motor element, said cylinder containing a rolling ball and adjustable means to temporarily retard it at the higher end as the cylinder rocks, an electric switch and a rod attached to the switch and having a stud standing in the path of the rolling ball whereby the switch is suddenly moved by the impact of the ball as it rolls in the cylinder, substantially as described.

4. An electric switch comprising a motor element adjustable in amount of motion, a pivotally mounted slotted cylinder attached to and rocked by said motor element, a rolling ball in the cylinder, a reciprocating rod mounted on the cylinder and having adjustable studs extending through said slots into the path of the ball, a switch closing arm pivotally attached to said rod and coöperating with another electrode, whereby the rolling ball by impact suddenly moves said rod both to open and close the electric switch and the range of movement of the motor element necessary to operate the switch is adjustable.

In testimony whereof I have hereunto signed my name in the presence of the two subscribed witnesses.

EDWARD V. ANDERSON.

Witnesses:
Jo. BAILY BROWN,
FRED'K STAUB.